(12) United States Patent
Kim

(10) Patent No.: US 7,605,562 B2
(45) Date of Patent: Oct. 20, 2009

(54) RECHARGEABLE BATTERY MODULE

(75) Inventor: Tae-Yong Kim, Suwon-si (KR)

(73) Assignee: Samsung SDI Co., Ltd., Suwon (KR)

( * ) Notice: Subject to any disclaimer, the term of this patent is extended or adjusted under 35 U.S.C. 154(b) by 0 days.

(21) Appl. No.: 11/159,191

(22) Filed: Jun. 23, 2005

(65) Prior Publication Data

US 2005/0285567 A1 Dec. 29, 2005

(30) Foreign Application Priority Data

Jun. 25, 2004 (KR) .................. 10-2004-0048156

(51) Int. Cl.
H02J 7/00 (2006.01)
(52) U.S. Cl. ........................ 320/107; 429/99
(58) Field of Classification Search ................ 320/107, 320/104; 429/120, 99–100
See application file for complete search history.

(56) References Cited

U.S. PATENT DOCUMENTS

| | | | | |
|---|---|---|---|---|
| 5,034,290 A | * | 7/1991 | Sands et al. | 429/120 |
| 5,736,272 A | * | 4/1998 | Veenstra et al. | 429/99 |
| 6,051,328 A | * | 4/2000 | Witzigreuter et al. | 429/27 |
| 6,377,030 B1 | * | 4/2002 | Asao et al. | 320/161 |
| 6,645,666 B1 | | 11/2003 | Moores, Jr. et al. | |
| 6,709,783 B2 | * | 3/2004 | Ogata et al. | 429/120 |
| 6,953,638 B2 | * | 10/2005 | Inui et al. | 429/120 |
| 2001/0026886 A1 | * | 10/2001 | Inui et al. | 429/120 |
| 2003/0017384 A1 | * | 1/2003 | Marukawa et al. | 429/120 |
| 2003/0118898 A1 | * | 6/2003 | Kimura et al. | 429/120 |
| 2003/0193313 A1 | * | 10/2003 | Takedomi et al. | 320/107 |
| 2004/0142238 A1 | * | 7/2004 | Asahina et al. | 429/176 |

FOREIGN PATENT DOCUMENTS

EP 1143541 A1 * 10/2001
JP 2002-134083 5/2002

* cited by examiner

*Primary Examiner*—Edward Tso
*Assistant Examiner*—Samuel Berhanu
(74) *Attorney, Agent, or Firm*—H.C. Park & Associates, PLC

(57) ABSTRACT

A rechargeable battery module that exhibits superior temperature control and has a minimized size through an efficient arrangement of unit batteries is provided. The rechargeable battery module has a plurality of unit batteries that are arranged at constant intervals and a housing that holds the unit batteries and in which air for controlling a temperature of each of the unit batteries flows. The unit batteries are divided into two battery columns that are provided on either side of a central structure such that terminals of the unit batteries in different columns face each other.

12 Claims, 6 Drawing Sheets

RECHARGEABLE BATTERY MODULE

CROSS REFERENCE TO RELATED APPLICATION

This application claims priority to and the benefit of Korean Patent Application No. 10-2004-0048156, filed on Jun. 25, 2004, which is hereby incorporated by reference.

BACKGROUND OF THE INVENTION (a) Field of the Invention

The present invention relates to a rechargeable battery. In particular, the present invention relates to a rechargeable battery module that has an improved arrangement of unit batteries that minimizes the overall volume of the rechargeable battery module when the unit batteries are connected to form the rechargeable battery module.

(b) Description of the Related Art

In recent years, high-power rechargeable batteries that use non-aqueous electrolytes that have high energy densities have been developed. For example, a plurality of high-power rechargeable batteries may be connected together in series to form a large-scale rechargeable battery that can drive a motor in a high-power apparatus such as an electric vehicle and the like.

A single large-scale rechargeable battery, referred to as a battery module, generally comprises a plurality of rechargeable batteries, referred to as unit batteries that are connected to each other in series. Each of the unit batteries includes an electrode assembly that comprises an anode and a cathode with a separator interposed therebetween, a case that has a space for housing the electrode assembly, a cap assembly that is combined with the case to cover the case, and an anode terminal and a cathode terminal that are coupled with collectors of the anode and the cathode in the electrode assembly, respectively.

In a rectangular unit battery, the anode terminal and the cathode terminal that project from the cap assembly are generally arranged alternately with the anode terminal and the cathode terminal of an adjacent unit battery. Then, conductors, such as nuts, are provided between the screw-shaped anode terminals and cathode terminals, thereby forming the battery module.

A battery module has several to tens of unit batteries that are connected to each other. The battery module may have a cooling structure to remove the heat that is generated in the respective unit batteries, a safety unit, a system circuit, and the like. The addition of these components results in an increase in the volume of the battery module.

In order to reduce the size of the battery module, a technique to reduce a gap between the unit batteries has been suggested. This technique has the drawback of making it difficult to dissipate heat that is generated in the respective unit batteries.

A critical design feature of a battery module is to allow it to easily dissipate the heat that is generated in the respective unit batteries while maintaining a minimal volume. This feature is especially important for rechargeable batteries that are applied to a hybrid electric vehicle (HEV).

Increased volume of the battery module may also increase, the weight of the battery module itself. For an HEV comprising the battery module, the design thereof becomes difficult.

Further, when the heat is not properly dissipated, the heat from the respective unit batteries may cause an increase in temperature of the battery module. This may cause a malfunction of an apparatus that comprises the battery module.

The demand for a large-scale battery module with a minimal size and superior heat dissipation is increasing for use in HEVs and other apparatuses.

SUMMARY OF THE INVENTION

The present invention provides a rechargeable battery module that has superior temperature control and a minimum size through an efficient arrangement of unit batteries.

Additional features of the invention will be set forth in the description which follows, and in part will be apparent from the description, or may be learned by practice of the invention.

The present invention discloses a rechargeable battery module that comprises a plurality of unit batteries that are arranged at constant intervals and a housing that holds the unit batteries and into which air flows to control the temperature. The unit batteries are divided into at least two columns that are provided on both sides of a central structure such that terminals of the unit batteries in different columns face each other.

It is to be understood that both the foregoing general description and the following detailed description are exemplary and explanatory and are intended to provide further explanation of the invention as claimed.

BRIEF DESCRIPTION OF THE DRAWINGS

The accompanying drawings which are included to provide a further understanding of the invention and are incorporated in and constitute a part of this specification, illustrate embodiments of the invention and together with the description serve to explain the principles of the invention.

DETAILED DESCRIPTION OF THE ILLUSTRATED EMBODIMENTS

The battery module of the present invention may effectively be used in an apparatus that uses a motor such as a hybrid electric vehicle (HEV), an electric vehicle (EV), a wireless device, an electric-powered bicycle, an electric-powered scooter, and the like.

According to the present invention, the arrangement of the unit batteries in the battery module may be improved and thus the volume of the battery module may be minimized. Further, the connection between the unit batteries in the battery module and the structure for the gas emission may be shared, thus simplifying the structure of the battery module.

Figure 1:
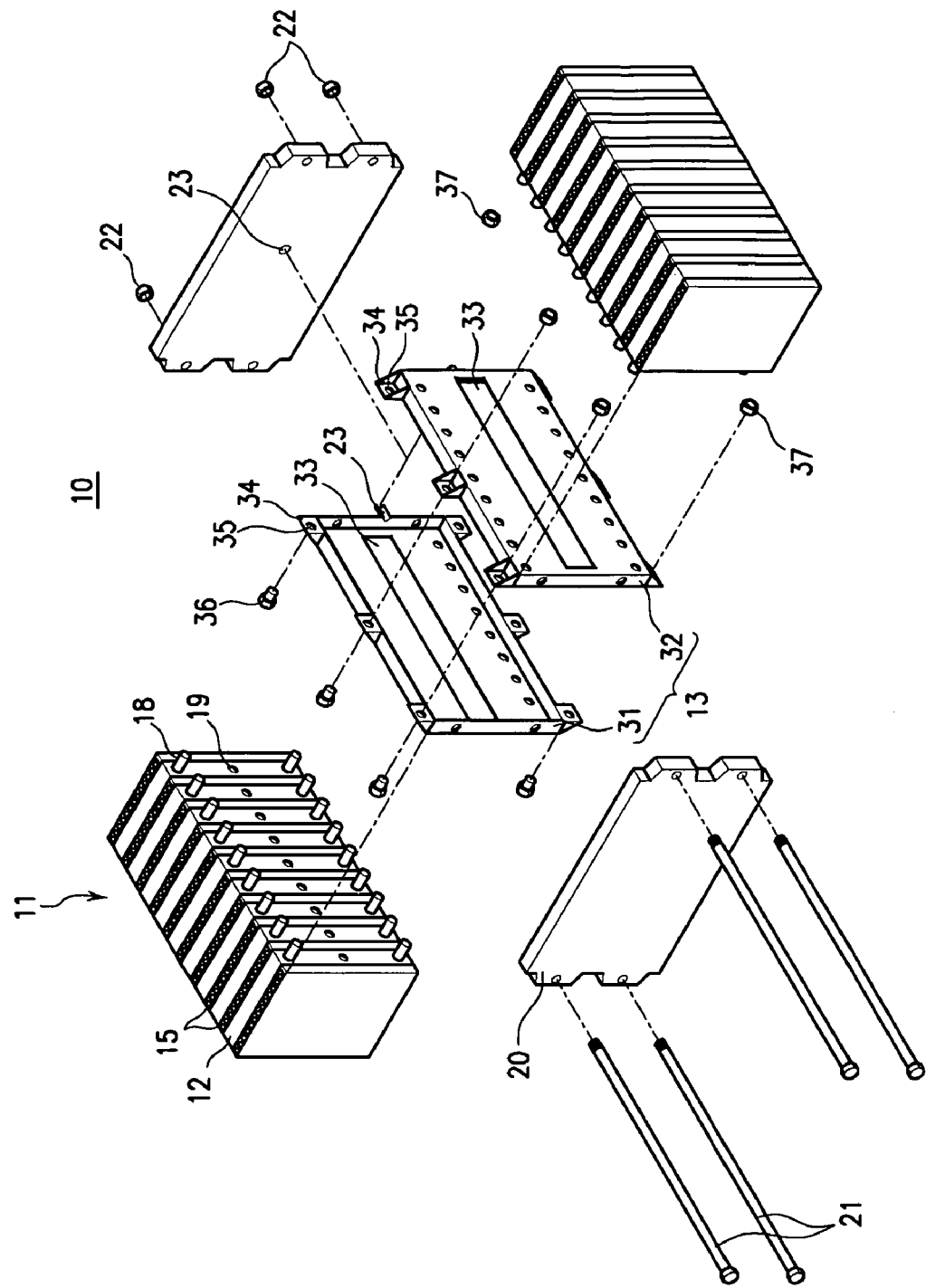
FIG. 1 is an exploded perspective view that schematically shows a configuration of a rechargeable battery module according to an exemplary embodiment of the invention.
Figure 2:
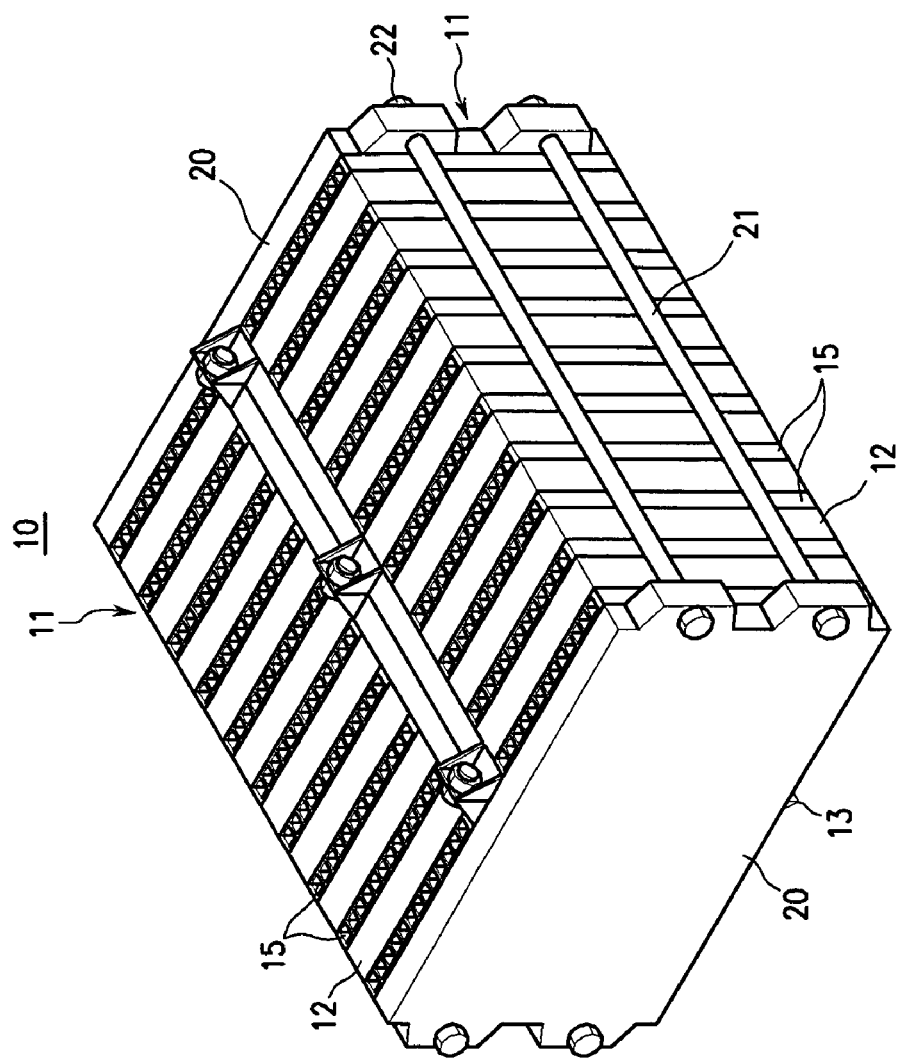
FIG. 2 is a perspective view that schematically shows a state in which the rechargeable battery module according to the exemplary embodiment of the invention is assembled.

FIG. 1 is an exploded perspective view that schematically shows a configuration of a rechargeable battery module according to an exemplary embodiment of the invention. FIG.

Figure 3:
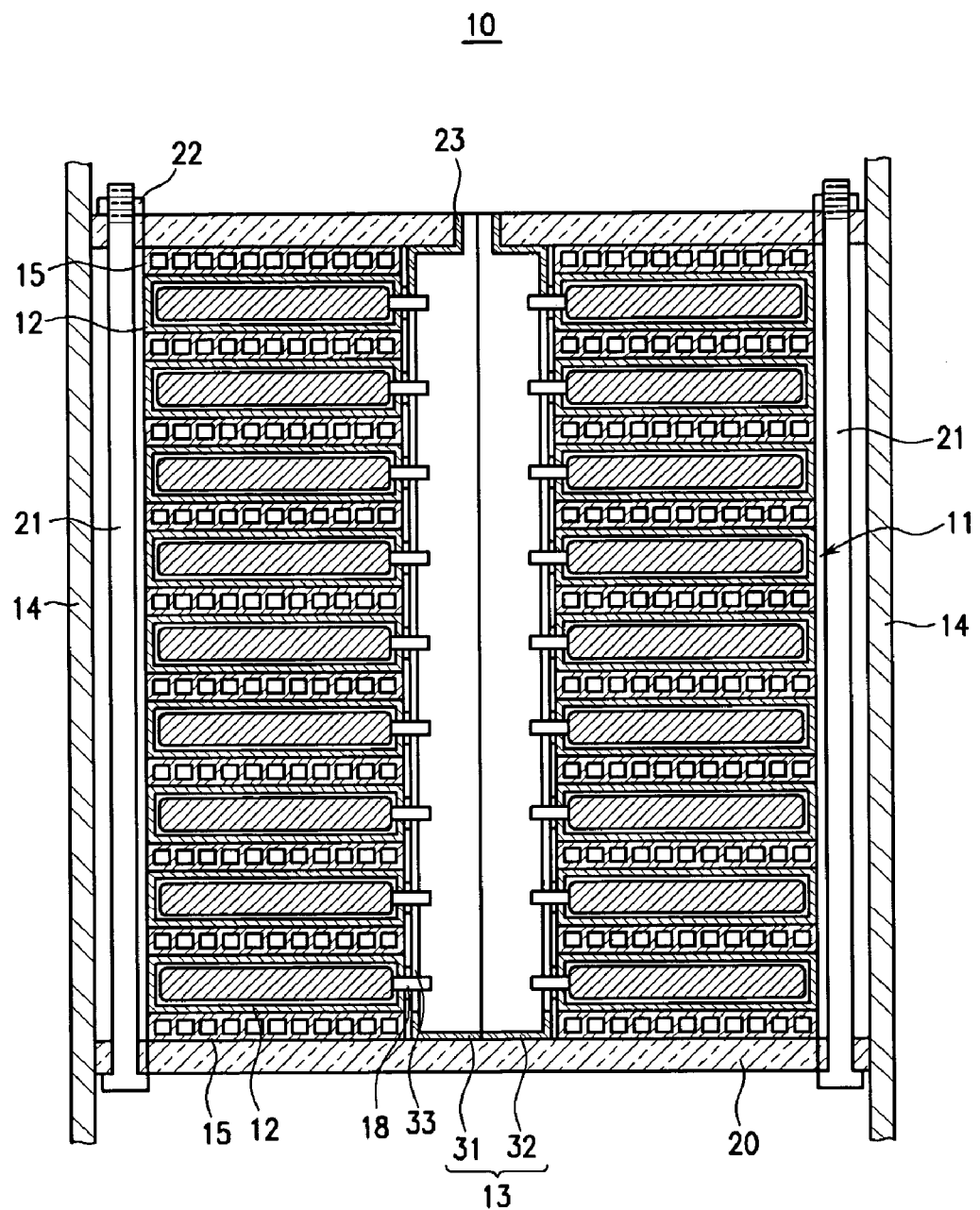
FIG. 3 is a top sectional view that schematically shows the rechargeable battery module according to the exemplary embodiment of the invention.
Figure 4:
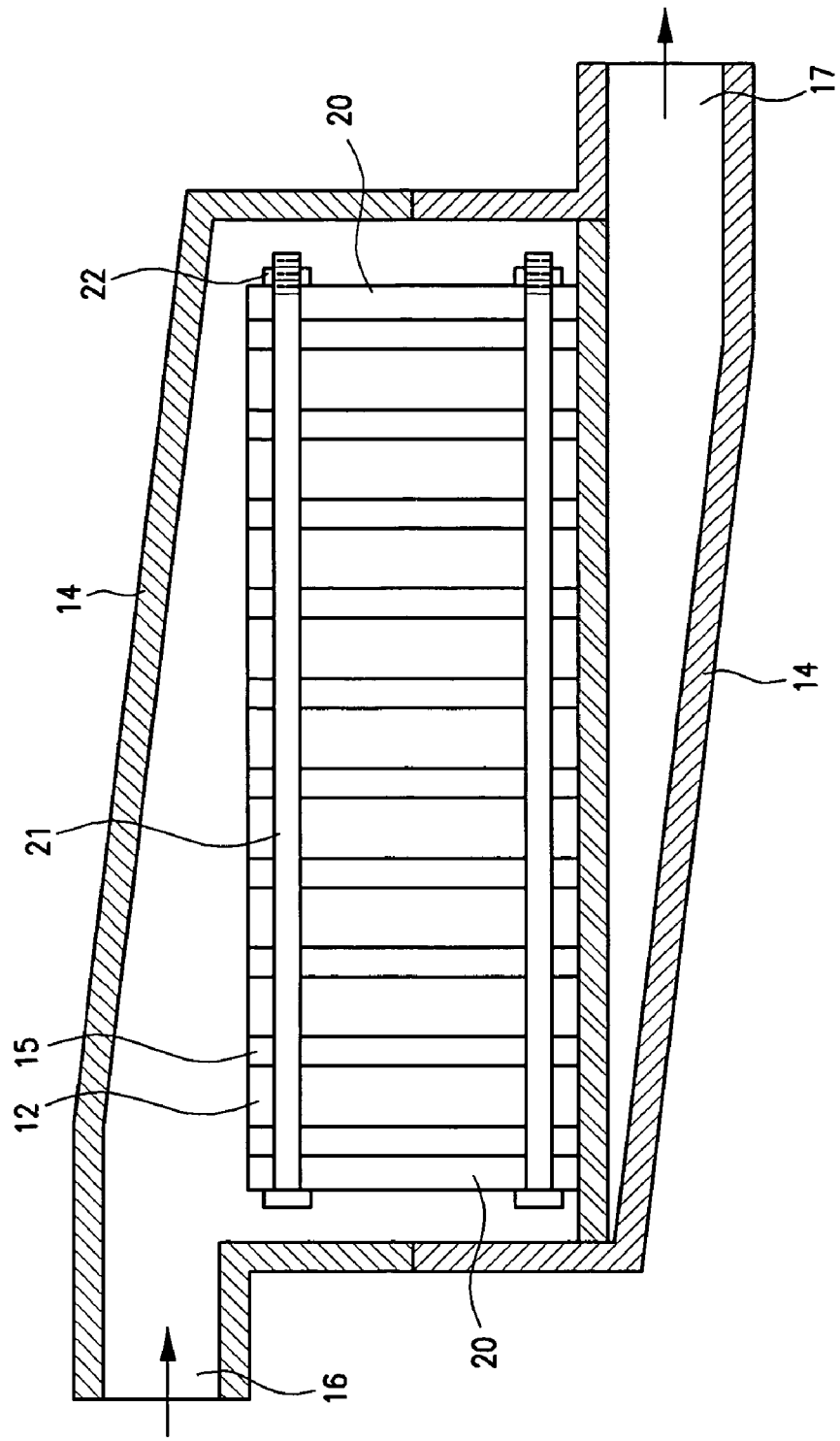
FIG. 4 is a side sectional view that schematically shows the rechargeable battery module according to the exemplary embodiment of the invention.

2 is a perspective view that schematically shows a state in which the rechargeable battery module according to the exemplary embodiment of the invention is assembled. FIG. 3 is a top sectional view that schematically shows the rechargeable battery module according to the exemplary embodiment of the invention. FIG. 4 is a side sectional view that schematically shows the rechargeable battery module according to the exemplary embodiment of the invention.

Referring to FIG. 1, FIG. 2, FIG. 3, and FIG. 4, a battery module 10 has a plurality of unit batteries 12 that each have an electrode assembly in which an anode, a cathode, and a separator are interposed between the anode and the cathode to generate power. The battery module 10 further comprises a central structure 13 that is provided between battery columns 11 that have the unit batteries 12 arranged at constant intervals and a connection circuit between the unit batteries 12, a sensor, and a path through which gas generated in the unit batteries 12 passes, and a housing 14 that houses the battery columns 11 and the central structure 13.

Hereinafter, a battery column 11 refers to the batteries that are arranged at constant intervals to form a column. In the present embodiment, the battery columns 11 are provided in a pair and are arranged on both sides of the central structure 13 to minimize the volume of the battery module 10.

The housing 14 has an inlet 16 that is formed at an upper end of one of its side surfaces and into which air for controlling the temperature of each of the unit batteries 12 flows. The housing 14 also includes an outlet 17 that is formed at a lower end of an opposing side surface of the housing through which the air passing through the unit batteries 12 is emitted.

In the present embodiment as shown in FIG. 4, the structure in which the inlet 16 and the outlet 17 are formed at the upper end of the a side surface and the lower end of an opposing side surface of the housing 14, respectively, are described. However, the structure of the housing 14, the positions of the inlet 16 and the outlet 17, and the arrangement of the unit batteries 12 in the housing 14 are not particularly limited as long as the above-described conditions are satisfied.

A battery partition wall 15 in which an air path is formed vertically is provided between the unit batteries 12 to maintain the gap between the unit batteries 12.

The air in the housing 14 through the inlet 16 at the upper portion of the housing 14 flows into the lower portion of the housing 14 after passing through the battery partition walls 15. The air is emitted through the outlet 17 of the lower portion of the housing 14.

Further, restraint plates 20 are provided outside the battery partition walls 15 on the outermost sides of the respective battery columns 11 to restrain the laminated partition walls 15 and the unit batteries 12 at a predetermined pressure. The restraint plates 20 are restrained and fixed using restraint rods 21 which are inserted through holes that are formed in the restraint plates 20, and nuts 22.

In the present embodiment, four restraint rods 21 pass through the restraint plates 20 and the nuts 22 are restrained to the tips of the restraint rods 21, such that the unit batteries 12 and the battery partition walls 15 are restrained by the restraint plates 20.

Figure 5A:
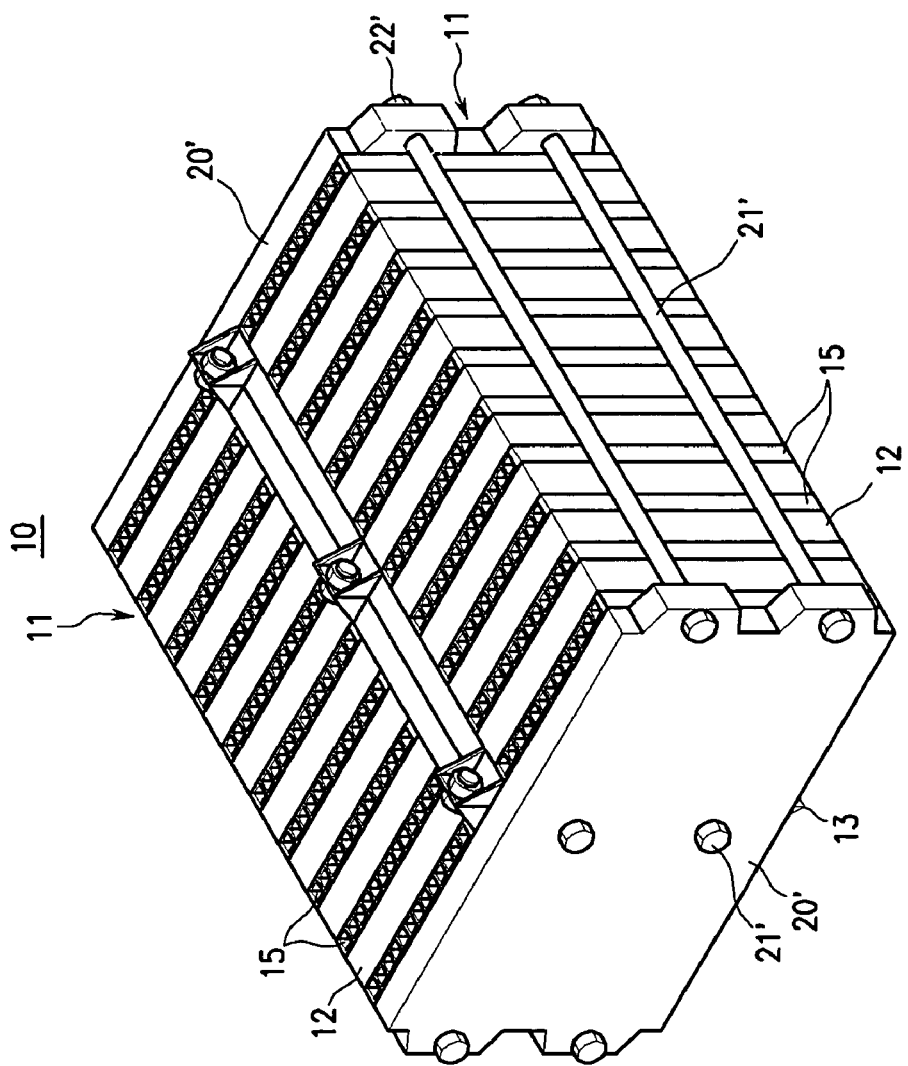
FIG. 5A and FIG. 5B are perspective views that schematically show a state in which the rechargeable battery module according to another exemplary embodiment of the invention is assembled.

As shown in FIG. 5A, restraint plates 20' may be restrained and fixed by six restraint rods 21', including restraint plates 20' that are disposed at positions where the central structure 13 is placed, and nuts 22' which are screw-joined with the restraint rods 21'.

Figure 5B:
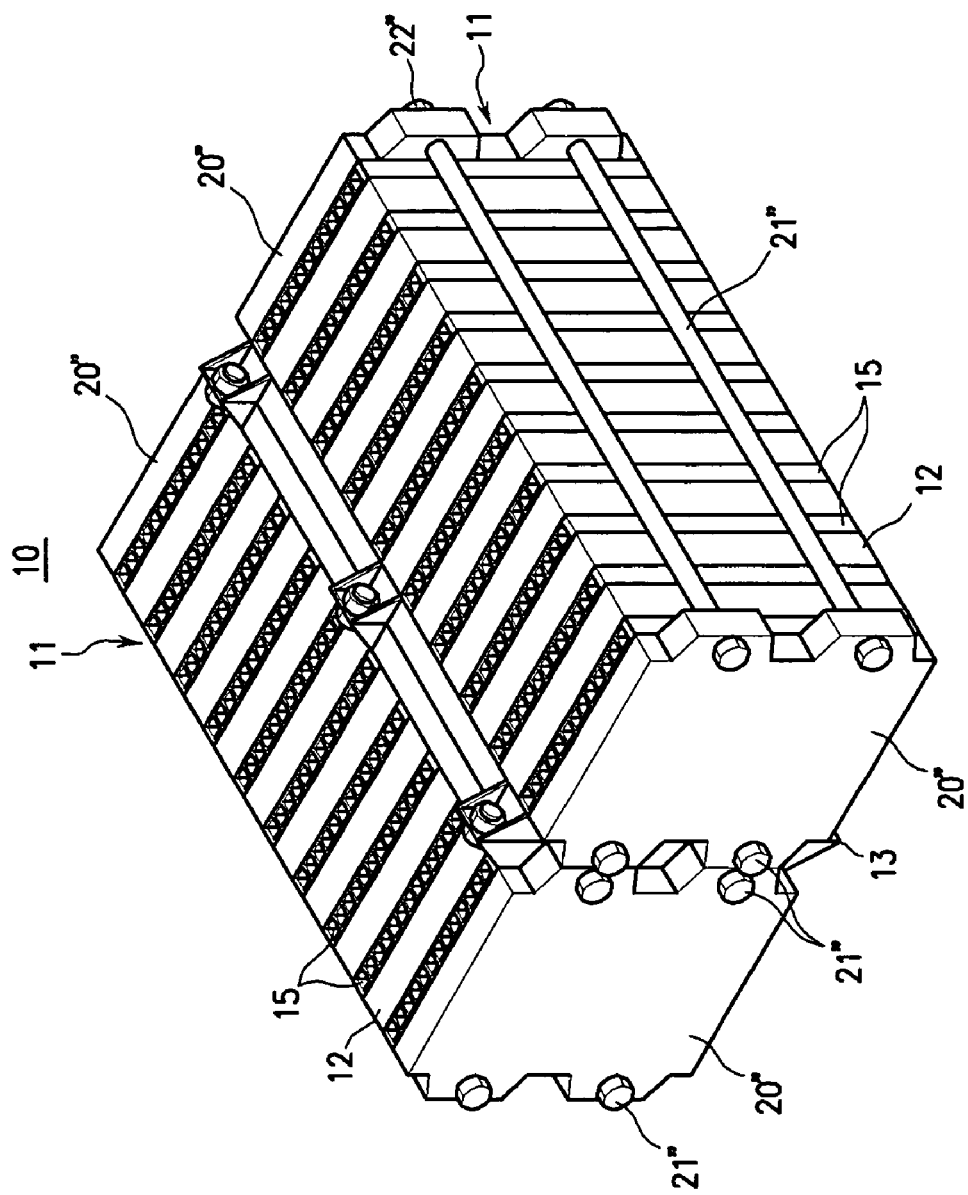

Further, as shown in FIG. 5B, when disposed on an outer side the battery column 11, the restraint plate 20" may be divided into two or more parts. In this case, the central structure 13 is placed between the divided restraint plates 20". In FIG. 5B, four restraint plates 20" are restrained and fixed by eight restraint rods 21" and nuts 22" which are screw-joined with the restraint rods 21".

The unit batteries 12 in the battery columns 11 are consecutively arranged with the partition walls 15 along both side surfaces of the central structure 13 such that cap assemblies with the terminals 18 formed therein are disposed to face the central structure 13.

The central structure 13 is disposed at the center of the housing 14 and the respective battery columns 11 are arranged along both side surfaces of the central structure 13. Further, the unit batteries 12 in the battery columns 11 are arranged such that the terminals 18 face the central structure 13.

Accordingly, the unit batteries 12 are divided into two battery columns 11 based on the central structure 13. The unit batteries 12 in the battery columns 11 are arranged such that the terminals 18 that are provided in the cap assemblies face each other in the central structure 13.

Further, the respective unit batteries 12 are combined in an airtight manner with the central structure 13 and the terminals 18 that are provided in the cap assemblies of the unit batteries 12 that extend into the central structure 13. Safety valves 19 that are provided in the respective cap assemblies are connected to the central structure 13.

As a result, one central structure 13 is arranged between the two battery columns 11, such that the battery columns 11 share a central structure 13.

The central structure 13 may be a boxlike, hollow structure that has a connection circuit (not shown) that couples the terminals 18 of the respective unit batteries 12 to each other and to a sensor (not shown). Thus, the central structure 13 serves as a path. Thus, when the safety valves 19 of the unit batteries 12 are opened, the gas emitted from the unit batteries 12 flows into the central structure 13.

The central structure 13 may comprise a plastic material such as acrylonitrile butadiene styrene (ABS) or polyphenylene sulfide (PPS), for example, to insulate it from the unit batteries 12.

Further, an emission hole 23 is formed at an end of the central structure 13 and an additional hose is connected to the emission hole 23 to emit gas from the central structure 13 to a desired place such as outside a vehicle on which the battery module 10 is mounted.

The central structure 13 will be described in detail with reference to FIG. 1. The central structure 13 may be divided into two separate members 31 and 32 that are detachably connected to each other such that the connection circuit between the unit batteries 12 and the sensor may easily be provided in the central structure 13.

The two separate members 31 and 32 have the same shape and a space is defined when the two separate members 31 and 32 are coupled with each other.

In the front surfaces of the members 31 and 32, holes 33 are formed to connect the safety valves 19 of the unit batteries 12. Thus, when the safety valves 19 are opened, gas may flow in the central structure 13.

In addition, a plurality of restraint members 34 are formed to project from outer ends of the members 31 and 32. Restraint holes 35 are respectively formed in the restraint members 34 to couple the two members 31 and 32 to each other. Then, the two members 31 and 32 are combined to each other by restraining bolts 36 and nuts 37 via the restraint holes 35, thereby forming the central structure 13.

In the battery module 10 of the present embodiment, the two battery columns 11 that each have unit batteries 12 share the single central structure 13. Thus, as shown in Table 1, the volume of the battery module may be reduced, as compared to the structures that have a connection circuit for the terminals 18, a sensor, and a gas emission path for each of the battery columns 11.

TABLE 1

| Type | Air Flow Method | Volume (m$^3$) |
| --- | --- | --- |
| Upper Structure Type | Horizontal Flow | 10.42 |
| Outside Structure Type | Vertical Flow | 10.34 |
| Present Embodiment (Central Structure Type) | Vertical Flow | 8.89 |

In Table 1, the upper structure type refers to the two battery columns that are arranged parallel to each other and the structure that has a terminal connection circuit, a sensor, and a gas path that covers all battery columns. Further, the outside structure type refers to the two battery columns that are arranged parallel to each other, the terminals of the unit batteries in the respective columns are arranged toward the outside, and the structures that have the terminal connection circuit, the sensor, and the gas path that are provided outside the respective battery columns.

For a battery module with the two battery columns, when the two battery columns 11 share a single central structure 13, the volume of the battery module may be minimized when compared to the upper structure type and the outside structure type.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A rechargeable battery module, comprising:
   a plurality of unit batteries;
   a housing that holds the unit batteries and allows air flow through it; and
   a central structure coupled with safety valves that are provided in the unit batteries,
   wherein the unit batteries are divided into at least a first battery column and a second battery column, and
   where in the first battery column and the second battery column are arranged on opposite sides of the central structure; the unit batteries of the first battery column are stacked in a first direction and have a positive and negative terminal, the unit batteries of the second battery column are stacked in the first direction and have a positive and negative terminal, and the positive and negative terminals of the unit batteries in the first battery column and the positive and negative terminals of the unit batteries in the second battery column face each other in a second direction perpendicular to the first direction while extending from the unit batteries into the central structure.

2. The rechargeable battery module of claim 1, wherein the unit batteries are coupled in an airtight manner to two side surfaces of the central structure.

3. The rechargeable battery module of claim 1, wherein a terminal connection circuit is provided in the central structure to couple the terminals.

4. The rechargeable battery module of claim 3, wherein an emission hole is formed on a side of the central structure to emit gas.

5. The rechargeable battery module of claim 1, wherein a battery partition wall is provided between the unit batteries to maintain a gap between the unit batteries and to allow cooled air to flow.

6. The rechargeable battery module of claim 1, wherein the housing has an air inlet and an outlet such that air passes through the unit batteries.

7. The rechargeable battery module of claim 1, further comprising:
   a restraint plate disposed outside the battery columns; and
   a restraint rod and a restraint nut coupled with the restraint plate.

8. The rechargeable battery module of claim 1, wherein each of the unit batteries is polyhedral.

9. The rechargeable battery module of claim 1, wherein the battery module is a motor-driving battery module.

10. The rechargeable battery module of claim 1, wherein the central structure comprises a nonconductor.

11. The rechargeable battery module of claim 1, wherein the unit batteries of the first battery column and the unit batteries of the second battery column form a plurality of battery rows, each battery row comprising a unit battery of the first battery column and a unit battery of the second battery column.

12. The rechargeable battery module of claim 1, wherein the central structure is not a component of either the unit batteries of the first battery column or the unit batteries of the second battery column.

* * * * *